(12) United States Patent
Erling

(10) Patent No.: US 6,949,137 B1
(45) Date of Patent: Sep. 27, 2005

(54) SCULPTING / MODELING MATERIAL COMPOSITION

(76) Inventor: Dale Arthur Erling, 326 Hancock Ave., South Elgin, IL (US) 60177

( * ) Notice: Subject to any disclaimer, the term of this patent is extended or adjusted under 35 U.S.C. 154(b) by 0 days.

(21) Appl. No.: 10/652,905

(22) Filed: Sep. 2, 2003

(51) Int. Cl.[7] .................. C09D 103/02; C09D 105/00; C09D 197/02
(52) U.S. Cl. .............................. 106/162.5; 106/162.51
(58) Field of Search ........................ 106/162.5, 162.51

(56) References Cited

U.S. PATENT DOCUMENTS

| | | | | |
|---|---|---|---|---|
| 3,427,176 A | * | 2/1969 | Shozaburo | 106/124.81 |
| 5,160,368 A | * | 11/1992 | Begovich | 106/126.2 |
| 5,618,341 A | * | 4/1997 | Andersen et al. | 106/287.35 |
| 5,922,379 A | * | 7/1999 | Wang | 426/138 |
| 6,379,446 B1 | * | 4/2002 | Andersen et al. | 106/162.5 |
| 6,589,327 B1 | * | 7/2003 | Snidow | 106/162.51 |

* cited by examiner

*Primary Examiner*—David Brunsman

(57) ABSTRACT

A sculpting/modeling medium is provided comprised of a nontoxic premixed loose ground cellulose material present in the amount ranging from 10–15% by weight; a vegetable adhesive present in the amount ranging from 75–85% by weight; and water present in the amount of 5–10% by weight. The medium may also include a quantity of food coloring or dyes blended in a proportion such that the color of the medium is due primarily to the dyed color of the cellulose. Also present is a method of making the same.

6 Claims, No Drawings

SCULPTING / MODELING MATERIAL COMPOSITION

FIELD OF INVENTION

The present invention relates to a molding and or sculpting medium and more particularly to a medium having a dough-like quality that is ready for use by older children and the serious artist to sculpt into specific shapes and forms. When dry, the present invention can be machined with low-force devices. One element of the present invention is the adhesion to materials that are used as a substrate or armature. Another element of the present invention is the sticky composition of the medium in its wet form, which lends itself to the adhesion of materials that may be added to the surface of the sculpted project. Upon drying, the present invention resists cracking and distortion, providing a lightweight durable sculpture having unique color properties and an interesting tactile surface.

BACKGROUND OF THE INVENTION

Materials that are soft and pliable before being cured and that later become hard and inflexible after being cured is well known in the art of sculpturing. Depending upon the specific materials involved, curing may be carried out in a number of ways. With some materials, curing is carried out at room temperature. With other materials, curing is carried out at relatively moderately elevated temperatures, such as in an oven. With still other materials, curing is carried out at high temperatures, such as in a kiln. Some materials require specific curing environments that may be difficult to provide under certain circumstances. For example, a kiln is an expensive piece of equipment and consumes a lot of energy during operation. In this respect, it would be desirable if a sculpting material were provided that could be cured in a simple curing environment.

A common sculpting medium is clay that is of mineral origin and comes either in water-based or oil-based form. The artist or craftsperson that fashions pottery or small figurines typically uses water-based clays. Drying of such objects is a tedious process to insure the result is free of cracks. Firing is required to insure permanency. Water-based clays generally do not come in a range of colors except those that are the natural coloration of the mineral filler, typically gray or brown. Coloration must be applied to the surface after firing and fired again to preserve the color. After completion, the article is heavy, fragile, and brittle. Oil-based clays are produced in range of malleability and often come in a range of colors. These products, however, are non-drying and incorporate pigments which can stain textiles, carpeting, furniture, and other surfaces.

Another class of modeling compound is of vegetable origin. Some incorporate starch as filler and are these primarily intended for children. Such doughs have low viscoelasticity, are easily malleable, and come in various colors. Because it is the binder that is pigmented, color brightness is generally lacking. Further, such doughs have a tendency to flake, crack, and crumble in both wet and dry stages. Starched-based dough's are unsuitable for fashioning permanent sculptures as drying induces considerable distortion and cracking of the finished object. Covering a flat armature of Styrofoam™ with this type compound causes considerable warping.

Another class of sculpting medium is polymer base. One formulation incorporates polyvinyl chloride as the filler. Formation of a permanent sculpture usually requires a curing process at an elevated temperature that causes the material to release toxic gases. The material itself is somewhat toxic. The polymer formula that is cross-linked, or gelled are resilient and lightweight yet demonstrates viscoelasticity. The materials are hard to shape with precise detail and tend to return to their initial positions. They dry quickly upon exposure to air, thereby demonstrating a short working time.

Another class of sculpting medium is plaster base. These types of compounds are widely used in the modeling industry by the artist and craftsmen alike. These compounds form very well into molds of various types and sizes. The material dries very hard, can be painted with any number of types of paints; and it can be sanded and carved easily. The major drawbacks are its weight and a high tendency to chip and show stress cracks on larger projects. The material dries quickly upon exposure to air, thereby demonstrating a shorter working time.

It is often desirable that an object that is sculpted be colored. Coloring sculptured objects can be obtained from two different approaches. One approach is to paint the sculpted object after it is formed. Another approach is to have the sculpting medium contain coloring materials. A number of disadvantages are associated with painting a sculpted object after its formation. One disadvantage is the selection of a proper paint that will adhere strongly to the sculpted object. Another disadvantage is finding the desired color that has the desired adherence characteristics. Because of these problems, the approach of having the sculpting medium pre-colored may be preferred.

As mentioned above, sculpting mediums are varied in their composition. Similarly, there are a wide variety of coloring materials. Such variety of coloring materials increases the possibilities in preparing blends that have incompatible ingredients. In this respect, it may be difficult to discover and blend a compatible combination of sculpting material and coloring materials. Therefore, it would be desirable if a sculpting medium were provided that is capable of being prepared in a wide variety of readily available and compatible coloring materials.

When a sculptor is using sculpturing materials, the hands of the sculptor must often be kept wet with water to permit the hands to slide readily over the work being sculpted. Constant exposure to water in this manner may have deleterious effects on the sculptor's skin. The water leaches out the natural skin oils leaving the skin abnormally oil deficient. Therefore, it would be desirable to find a sculpturing material that allowed the hands of a sculptor to have an oil-based material applied on them while working with the medium. The presence of oil on the hands, such as cold cream, will preclude the natural oils of the hands being leached out by the water.

SUMMARY OF THE INVENTION

To achieve the foregoing and other advantages, the present invention, as briefly described, provides a new sculpting medium comprised of a mixture of: a quantity UL approved, nontoxic, loose fill ground cellulose-containing material; a quantity of a nontoxic vegetable-based adhesive; a quantity of dye or food coloring; and a quantity of water, to produce a sticky dough-like sculpting medium. In wet form, the present invention is a sculpting material ready for use.

The above brief description sets forth the important features of the present invention in order that the detailed description that follows may be better understood, and in order that the present contributions to the art may be better appreciated. There are, of course, additional features of the invention that will be described hereinafter and which will be for the subject matter of the claims appended hereto.

Before explaining some of the preferred embodiments of the present invention in detail, it is understood that the invention is not limited in its application to the details of the components set forth in the following description. The invention is capable of other embodiments and of being worked and carried out in various ways. Also, it is understood, that the phraseology and terminology employed herein are for the purpose of description and should not be regarded as limiting.

As such, those skilled in the art will appreciate that the conception, upon which disclosure is based, may readily be a basis for providing other compositions and methods for carrying out the several purposes of the present invention. It is important, therefore, that the claims be regarded as including such equivalent compositions and methods insofar as they do not depart from the spirit and scope of the present invention.

Further, the purpose of the foregoing Abstract is to enable the U.S. Patent and Trademark Office and the public generally, and especially the scientists, engineers, teachers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

It is therefore, an objective of the present invention to provide a new ready to use sculpting material that has many of the advantages of other sculpting materials and none of the disadvantages.

It is another objective of the present invention to provide a new sculpting material that may be easily and efficiently manufactured and marketed.

A third objective of the present invention is to provide a new sculpting material that is capable of low cost manufacturing with regard to both materials and labor; and, that accordingly is then capable of a low sales price to the consuming public thereby making such sculpturing material available to the buying public.

A still further advantage of the present inventive sculpting medium is that this medium is ready to use.

Still another objective of the present invention is to provide a new sculpturing material that has a substantially homogeneous consistency and a substantially homogeneous composition.

Another objective of the present invention is to provide a new sculpting material that is composed of ingredients that are readily available.

Even another objective of the present invention is to provide a new sculpting material that is a blend of a relatively small number of ingredients.

Still a further objective of the present invention is to provide a new sculpting material that is capable of being prepared with a wide variety of readily and compatible coloring materials.

Yet another objective of the invention is to provide a new sculpting material that is adapted to being handled by hands of a sculpture, which have an oil-based material, applied thereto.

The advantages of the present invention-sculpting medium are many in that it has the ability to be colored, shaped and textured in a variety of ways. These processes can be obtained in many ways.

1) When vivid coloring of the medium is desired the loose fill material may be dyed before mixing the fill with the other medium components. This will achieve a different color other than the natural granite like gray color, which is the inventions color after mixing.
2) When muted coloring of the medium is desired food coloring may be added to the adhesive before mixing the adhesive with the other medium components.
3) Art materials, natural or synthetic, can be added topically to the invention. While still in a wet state, this invention shows strong binding characteristics to materials that are added to and/or lightly imbedded into the surface of the invention.
4) The exterior surface of an object sculptured from this medium may be colored after the object is dry.
5) When formed and dried, further shaping by cutting and sanding is possible.
6) The use of the medium when manufacturing plunge molds.
7) The use of the medium when manufacturing prototypes for rubber molds.

These processes are explained in the following examples:
1) The loose fill material is soaked in a mixture of dye, commonly known as Ritz Dye™. This is an especially preferred process, because the loose fill fibers remain colorfast and will not bleed out. The dyed wet loose mixture is then air-dried. This drying process may incorporate the use of commercially available dryers. When dry, the colored, cellulose fill material is mixed into the adhesive, to complete the mixing process, thereby giving the invention a true vivid color.
2) This invention can be colored by the addition of a coloring agent, commonly known as food coloring, to the adhesive. This process is less costly than previous mentioned coloring process because it requires less time and no additional drying equipment. Although the end results are the same, the invention-sculpting medium may take on a less vivid color. This is a positive feature for the modeler or artist who is creating natural scenic dioramas, as in model railroading, historic recreations, and the like. A passive softer earth tone is most desired when sculpting natural scenic recreations.
3) This invention is a sticky dough-like material that has good adhesive qualities and the ability to bond other materials to its surface. The present invention gives the artist or one who sculptures the opportunity to add other artistic materials to the surface of the covered object or project while it is still in it's wet, or creative state. The material readily accepts and holds art objects, such as button eyes, feathers, and sundry items. Materials such as powdered rock, sands, small gravels, scenic grasses, and other materials used by the artist and craftsmen, gives this present invention an added dimension not found in many other sculpting and modeling mediums.
4) A wide spectrum of different types of products can be used to color the exterior surface of an object sculpted from this inventive medium. Latex paints, oil-based paints, watercolors, and acrylics can be painted on with very good adhesion. Wood stains, both oil and water base, will also change the dynamics of the finished project. This invention shows all the positive attributes of coloring and painting a finished project with no adverse reactions to the chemical makeup of the composition found in other mediums. Coloring agents may also be added to the present inventions composition when in a wet, pliable state.

5) This medium according to the invention, can be fashioned into any number of objects, that when dried, form permanent art objects. The material, once dried, can be sanded, carved or machined so that finished sculptures may be altered. The digital coloring aspect of the medium provides a pleasingly different aesthetics to the finished artwork as well as useful instructional tool for understanding color. Magnets can be placed in the finished sculptures to create refrigerator magnets. Further, the medium readily accepts water-based glues such as Elmer's™ in both the wet and dry state allowing for a greater versatility in fashioning intricate sculptures. The sculpting medium is particularly appropriate for fashioning or forming objects where lightness of weight is particularly important, such as large pieces where differences in structural mass are obvious or where the encumbrance in weight is a distraction such as a facemask.

6) The present inventions lightweight material also has application for objects such as airplane gliders, canopies, even with aerodynamically shaped body parts. This is a process that incorporates the use of plunge molds when manufacturing the formations of such parts. The process is as follows: a mold is created using said invention. The mold is then plunged into a suspended sheet of hot plastic, forming the hot plastic around the mold. The mold is then cooled; the form is cut out of the sheet resulting in a finished product. As an example; this process is used in the manufacturing of model airplane canopies. These molds are typically made of exotic woods that are becoming increasingly rare and expensive to use. The present invention would give the manufacture of said products, an alternative material in the formation of the plunge molds. The present invention lends itself particularly well to the formation of plunge molds due to a strong, hard surface with which it cures. After curing, the invention is well suited for the use of low force machining tools, sanders, drills, and small milling devices. The invention's inherent lightweight and adhesion to a substructure enables the manufacture to use an inexpensive armature, such as Styrofoam™ or wood, and a thin layer of the sculpting medium. The use of the present invention in this type of manufacturing process allows the modeling industry to realize a cost saving in the production of their parts.

(7) The present invention is well suited for the creation of prototypes. Prototypical forms can then be utilized in the making of rubber molds for mass production of such. Rubber molds are used in the model railroad industry for the plaster casting of rock formations. The pliable composition of the present invention allows for the modeling medium to be spread over an armature of wood, Styrofoam™, paper or other such surfaces. The present invention may be applied to freestanding forms, two dimensional forms, and castings. The invention dries with a granite-like appearance, unless it is pre-mixed with a coloring agent added. This singular quality makes it a unique product for fabricating landscapes within the model railroading community.

In addition to the previously mentioned advantages the present invention demonstrates a good usage of working time; it does not dry rapidly upon exposure to air, although it is cured at room temperature in about eight to ten hours. It does not require the need for firing or baking. The thickness with which the medium was applied is relative to its drying time. The thicker it is applied, the longer it may take to dry. The preferred range of thickness for applied medium is, for example, from 1/16" to 3/8". If a thicker coat is desired, another layer should be added after sufficient curing time has lapsed. This invention dries hard yet resists chipping and cracking. Upon drying this invention does not demonstrate excessive shrinking when compared, for example, to sculpting clays. The type of substrate used in a flat project may allow some warping to occur, Styrofoam™ may warp, whereas plywood would not.

Still another advantage of this material is the capability of arresting or controlling the curing (drying) process by placing the sculpture in an airtight container or bag or by wrapping the structure with a water impermeable barrier. Thus a sculpting in process can be temporarily suspended without damage or distortion and then restarted at a more favorable time without detrimental effects to the sculpture.

While the present invention has been fully described with particularity and detail in connection with what is presently deemed to be the most practical and preferred embodiments of the invention, it will be apparent to those of ordinary skill in the art that many modifications can be made without departing from the principles and concepts set forth herein. There are applications of the present invention that can be used in education, science, math and industrial technical fields that are left only to the creativity of the mind. Hence, the proper scope of the present invention should be determined only by the broadest interpretation of the claims so as to encompass all such modifications and equivalents.

DESCRIPTION OF THE PREFERRED EMBODIMENT

This inventive composition of matter or medium particularly adapted for sculpting may be prepared by providing a quantity of ground cellulose material, a quantity of a vegetable-based adhesive, and a quantity of water. The preferred ground cellulose is sold by REGAL™. The preferred adhesive is corn starch-based paste sold by Roman Adhesive, Inc. having the product designation of GH-80 GOLDEN HARVEST™ Adhesive.

As noted earlier, where the composition in its hardened state is to have a color other than the natural color of the cellulose as diluted by the adhesive and water, a coloring agent is added. Where the medium is to have a selected vivid color, a household clothing dye sold by RITZ™, for example, is added and mixed into the cellulose. Where the medium is to have a muted color, a household food coloring is added and mixed into the adhesive.

Small quantities of the of the medium may be prepared by hand mixing the materials in a container using ones hands as if mixing dough. In this case, materials for the medium may be sold in kit form with the end user merely adding water and mixing. Where medium quantity exceeds 3-pounds the medium is best prepared using a mechanically powered mixer. For example, a commercial dough-mixing device can be used to affect a uniform intermixing of the ingredients.

The adhesive and water are placed in a vessel of this mechanical mixer and thourghly mixed, slowly add the cellulose into the mixing bowl and mix until a uniform consistency is obtained. The preferred material amounts are:

Vegetable-based adhesive 75–85% by weight
Water 10–15% by weight
Ground cellulose 10–15% by weight On a dry material basis, the preferred material amounts are 84 to 88% by weight Vegetable-based adhesive and 12 to 15% by weight ground cellulose.

When the consistency is uniform, all cellulose is wet, and the color is uniform, mixing is complete. After mixing, the medium is packaged in airtight containers. The expected shelf life is about one year.

What is claimed is:

1. A composition of matter particularly adapted to function as a pliable sculpting medium, said composition comprising:
    a quantity of a vegetable-based adhesive material,
    a quantity of a ground cellulose material, and
    a quantity of water,
    said quantity of said adhesive material being present in an amount by weight of 75 to 85 percent,
    said quantity of said cellulose material being present in an amount by weight of 10 to 15 percent, and
    said quantity of said water being present in an amount by weight of 10 to 15 percent,
    wherein, said composition in a pliable state may be formed into selective figures having workable exterior surfaces when said composition hardens and as hardened has a color like a color of said cellulose.

2. A composition of matter as defined by claim 1 and further characterized by,
    said cellulose material including a dye,
    wherein, said composition in a hardened state has a color like said.

3. A composition of matter as defined by claim 1 and further characterized by,
    said adhesive being a corn starch-based paste material.

4. A composition of matter as defined by claim 1 and further characterized by,
    said adhesive including a food coloring,
    wherein, said composition in a hardened state has a color like said food coloring.

5. A composition of matter particularly adapted as a sculpting medium, said medium in a hardened state comprising,
    a quantity of a vegetable-based adhesive being present in an amount by weight of 84 to 88 percent,
    a quantity of a ground cellulose material being present in amount by weight of 12 to 15 percent, and
    a trace quantity of water,
    wherein, as said medium transforms from a pliable state to said hardened state, said water in said medium evaporates.

6. A kit for preparing a pliable sculpting medium, said kit comprising,
    a quantity of a ground cellulose material being present in an amount by weight of 12 to 15 percent and
    a quantity of a vegetable-based adhesive paste being present in an amount by weight of 84 to 88 percent, and
    a trace quantity of water,
    wherein, for initial use, water is added to a mixture of said adhesive and said cellulose to make said pliable sculpting medium.

* * * * *